(12) United States Patent
Deslauriers

(10) Patent No.: US 11,084,672 B2
(45) Date of Patent: Aug. 10, 2021

(54) DOCK BUMPERS AND/OR VEHICLES BUMPERS

(71) Applicant: PRODUITS HEVEA INC., Richmond (CA)

(72) Inventor: Jean Deslauriers, Richmond (CA)

(73) Assignee: PRODUITS HEVEA INC., Richmond (CA)

( * ) Notice: Subject to any disclaimer, the term of this patent is extended or adjusted under 35 U.S.C. 154(b) by 0 days.

(21) Appl. No.: 16/251,961

(22) Filed: Jan. 18, 2019

(65) Prior Publication Data

US 2020/0130967 A1 Apr. 30, 2020

Related U.S. Application Data

(60) Provisional application No. 62/749,929, filed on Oct. 24, 2018.

(51) Int. Cl.
*B63B 59/02* (2006.01)
*B65G 69/00* (2006.01)
(Continued)

(52) U.S. Cl.
CPC ............ *B65G 69/001* (2013.01); *F16F 1/377* (2013.01); *F16F 1/3849* (2013.01);
(Continued)

(58) Field of Classification Search
CPC ................ B29C 33/0033; B65G 69/001
(Continued)

(56) References Cited

U.S. PATENT DOCUMENTS 2,017,071 A * 10/1935 Minor ..................... C08J 5/12
428/465
2,943,009 A * 6/1960 Mirsky ............... E21B 17/1042
264/259

(Continued)

FOREIGN PATENT DOCUMENTS

CA 2176797 A1 9/1997
CA 2158535 C 4/1999
(Continued)

OTHER PUBLICATIONS

Canadian Office Action dated Feb. 6, 2020, for Canadian Application No. 3,030,515 (4 p.).

*Primary Examiner* — Christopher P Schwartz
(74) *Attorney, Agent, or Firm* — Conley Rose, P.C.

(57) ABSTRACT

A composite bumper for the dampening of impact forces applied to a structure to be protected. The composite bumper comprises a first element of a rigid material; a second element resistant to impacts and mechanical abrasions and made of at least one of a first vulcanized rubber and a rigid material; and a third element having the ability to undergo reversible elastic deformations and made of a second vulcanized rubber. The third element is at least in part positioned between the first and the second element. The third element is bound to the first element and the second element because of the vulcanization of unvulcanized rubber composition(s). The first element is provided with means adapted to cooperate with means for the fastening of the composite bumper to the structure to be protected. A use thereof, and a method for the manufacture of the composite bumper.

20 Claims, 9 Drawing Sheets

(51) Int. Cl.
*F16F 1/377* (2006.01)
*F16F 1/38* (2006.01)
*F16F 1/44* (2006.01)

(52) U.S. Cl.
CPC .............. *F16F 1/3856* (2013.01); *F16F 1/44* (2013.01); *F16F 2224/025* (2013.01)

(58) Field of Classification Search
USPC .................. 114/219; 267/139, 140, 152, 153; 52/167.1–167.7; 293/132, 135, 136
See application file for complete search history.

(56) References Cited

U.S. PATENT DOCUMENTS

| | | | | |
|---|---|---|---|---|
| 4,679,517 | A * | 7/1987 | Kramer | B63B 59/02 114/45 |
| 4,761,925 | A * | 8/1988 | Fukahori | B32B 7/02 248/609 |
| 4,899,323 | A * | 2/1990 | Fukahori | E04B 1/36 248/560 |
| 5,095,840 | A * | 3/1992 | Kramer | B29C 33/0033 114/219 |
| 5,658,633 | A | 8/1997 | Di Biase | |
| 5,661,934 | A * | 9/1997 | Weisflog | B65G 69/001 267/139 |
| 5,765,322 | A * | 6/1998 | Kubo | E04H 9/022 248/634 |
| 6,180,711 | B1 * | 1/2001 | Shimada | B32B 25/04 524/495 |
| 6,224,809 | B1 * | 5/2001 | Orndorff, Jr. | B29C 33/0033 264/255 |
| 6,572,307 | B2 * | 6/2003 | Tajima | E02B 3/26 405/212 |
| 2019/0144217 | A1 * | 5/2019 | Di Biase | B65G 69/001 |

FOREIGN PATENT DOCUMENTS

| | | |
|---|---|---|
| CA | 2213109 C | 12/2001 |
| CN | 201306407 Y | 9/2009 |
| WO | 94/01695 A1 | 1/1994 |

* cited by examiner

DOCK BUMPERS AND/OR VEHICLES BUMPERS

CROSS REFERENCE TO A RELATED APPLICATION

The present patent application claims the priority of U.S. provisional patent application Ser. No. 62/749,929 filed Oct. 24, 2018, the content of which is incorporated herein in its entirety.

TECHNICAL FIELD

The technical field generally relates to dock bumpers and vehicles bumpers, more particularly for the dampening of impact forces applied to a structure of a buildings or a vehicle.

BACKGROUND

There exists a plurality of bumpers for the protection of at least one of loading docks, equipment and buildings, and/or for the protection of vehicles. More particularly, when a truck or a tractor coupled to a semi-trailer moves back to a loading dock, bumpers are generally the first line of defense for the protection of the loading dock and the integrity of the building, and/or for the protection of the truck or the semi-trailer.

Such bumpers are generally divided into two groups, that is bumpers for light and medium uses, and bumpers for intense uses.

Bumpers for light or medium uses are generally entirely made with an extremely rigid material (e.g. extremely stiff rubber) that shows a very low ability for diffusing energy resulting from an impact. Such bumpers are mainly used to create a space between a building and the rear of a truck or semi-trailer, in order to allow the pivoting of a dock leveler.

Bumpers for intense uses, are generally made of laminated rubber sheets positioned between a pair of angle-iron with metallic rods (preferably welded metallic rods). They are also very rigid and offer a low ability for diffusing energy resulting from an impact. In addition of creating a space necessary for pivoting a dock leveler, they slightly absorb the impact of trucks or semi-trailers. Also, there exists more resistant versions provided with a metallic face to reduce friction or versions comprising an assembly of a floating system.

Examples of existing loading dock bumpers are illustrated in Canadian patents 2.213.109, 2.176.797 and 2.158.535.

In spite of the fact that bumpers actually available on the market are, as such, resistant and with good guarantees from manufacturers, they offer very little protection for the buildings on which they are installed. After some use, the concrete surrounding the docks begins to crack and the repair costs are quite high. In addition, the repair of a loading dock and the replacement of bumpers require a shutdown, which can also be very expensive for companies which are dependent on their logistical efficiency. Also, there are also costs associated with the damage to trucks or semi-trailers that impact loading docks.

Therefore, there is a strong need for a bumper that will minimize and/or overcome the drawbacks associated with the use of existing bumpers.

The Applicant has now discovered new composite bumpers allowing to overcome and/or minimize drawbacks of existing bumpers. More particularly, with respect to existing bumpers, the Applicant has discovered a new composite bumper which are more resistant to mechanical abrasion and can effectively protect the integrity of buildings and/or vehicles (e.g. trucks, semi-trailers, etc.).

Much more particularly, the Applicant has developed a new composite bumper made of a rubber block, preferably a rubber block having different hardness, vulcanized to at least one element of a rigid material, preferably a steel anchor plate. This at least one element may be larger than or similar to a rear surface of the rubber block in case of intense use, or smaller than the rear surface of the rubber block in case of light or medium use.

Also, the Applicant has developed a new composite bumper that is provided with at least another element provided at the front of the composite bumper resistant to impacts (between the building and the vehicle) and resistant to mechanical abrasions (e.g. resulting of relative vertical movements between the vehicle and the building), in order to extend the useful life of said composite bumper. Also, said composite bumper can be installed on the vehicles (e.g. rear of trucks or semi-trailers) and/or at loading docks of buildings.

SUMMARY

According to one embodiment, the invention relates to a composite bumper for the dampening of impact forces applied to a structure to be protected, the composite bumper comprising:
(i) a first element made of a rigid material, preferably at least one plate of a rigid material;
(ii) a second element that is resistant to impacts and mechanical abrasions, the second element being made of at least one of a first vulcanized rubber obtained by vulcanization of a first unvulcanized rubber composition and of a rigid material; and
(iii) a third element having the ability to undergo reversible elastic deformations, the third element being made of a second vulcanized rubber obtained by vulcanization of a second unvulcanized rubber composition,
wherein the third element is at least in part positioned between the first element and the second element;
wherein the third element is bound to the first element and the second element because of
the vulcanization of the second unvulcanized rubber composition while in contact with at least a portion of the first element and at least a portion of the rigid material of the second element,
the simultaneous vulcanization of the first unvulcanized rubber composition and the second unvulcanized rubber composition, while the second unvulcanized rubber composition contacts the first unvulcanized rubber composition and at least a portion of the first element, or
the simultaneously vulcanization of the first unvulcanized rubber composition and the second unvulcanized rubber composition while the first unvulcanized rubber composition contacts at least a portion of the rigid material of the second element, and while the second unvulcanized rubber composition contacts at least a portion the rigid material of the second element and contacts at least a portion of the first element; and
wherein the first element is provided with at least one means adapted to cooperate with at least one fastening means for the fastening of the composite bumper to the structure to be protected.

According to another embodiment, the invention relates to the composite bumper defined hereinabove, wherein the vulcanization or the simultaneous vulcanization is carried within a mold.

According to another embodiment, the invention relates to the composite bumper defined hereinabove, wherein the second element is made of the first vulcanized rubber obtained by vulcanization of the first unvulcanized rubber composition.

According to another embodiment, the invention relates to the composite bumper defined hereinabove, wherein the second element is made of a plate of a rigid material. Preferably, the rigid material of the second element is made of at least one plate made of a rigid polymeric material or of a at least one plate of a metallic material. More preferably, the at least one plate of a metallic material of the second element is selected from the group consisting of a steel plate, a stainless-steel plate or an aluminum plate.

According to another embodiment, the invention relates to the composite bumper defined hereinabove, wherein the second element is made of the first vulcanized rubber obtained by vulcanization of the first unvulcanized rubber composition, and is made of at least one plate of a rigid element. Preferably, the rigid material of the second element is made of at least one plate made of a rigid polymeric material or of a at least one plate of a metallic material. More preferably, the at least one plate of a metallic material of the second element is selected from the group consisting of a steel plate, a stainless-steel plate or an aluminum plate. Much more preferably, the second element, the at least one plate of the rigid element is embedded within the first vulcanized rubber.

According to another embodiment, the invention relates to the composite bumper defined hereinabove, wherein the first vulcanized rubber further comprises reinforcing fibers, fabrics or felts. Preferably, the reinforcing fibers are Nylon fibers, and/or the first vulcanized rubber has hardness varying from 70 to 90 duro Shore A. More preferably, the first vulcanized rubber has a hardness of about 80 duro Shore A.

According to another embodiment, the invention relates to the composite bumper defined hereinabove, wherein the rigid material of the first element is made of at least one plate made of a rigid polymeric material and/or is made of a at least one plate made of a metallic material. Preferably, wherein the at least one plate made of a metallic material of the first element is selected from the group consisting of a steel plate, a stainless-steel plate or an aluminum plate.

According to another embodiment, the invention relates to the composite bumper defined hereinabove, wherein each of the means adapted to cooperate with at least one fastening means comprises a first hole provided in the first element; and wherein each of the at least one of the fastening means is a mechanical fastener having a head portion and a threaded portion, and being positioned across the first hole of the first element, the head portion of the mechanical fastener being adapted to contact the first element, and the threaded portion of the mechanical fastener being adapted to be screwed in the structure to be protected. Preferably, when the first hole of the first element is covered by the second element and the third element, then a second hole is provided across the second element and a third hole is provided across the third element, said second hole and third hole being coaxial with the first hole of in the first element, and being of a larger cross-section than a cross-section of the first hole to allow a housing of the head portion, and a contact of the head portion against the first element. More preferably, the mechanical fastener is a wedge anchor or a lag bolt screw, much more preferably a wedge anchor for concrete.

According to another embodiment, the invention relates to the composite bumper defined hereinabove, wherein the first element is embedded within the second vulcanized rubber of the third element.

According to another embodiment, the invention relates to the composite bumper defined hereinabove, wherein each of the means adapted to cooperate with at least one fastening means comprises a first hole provided in the first element; wherein each of the at least one fastening means is a nut-bolt assembly comprising a bolt having a head portion, a first shaft portion and a second shaft portion, and a nut adapted to engage the second shaft portion, wherein the head portion contacts the first element, the first shaft portion is at least in part positioned in the at least one first hole, and wherein the head portion and the first haft portion are embedded within the second vulcanized rubber.

According to another embodiment, the invention relates to the composite bumper defined hereinabove, further comprising:
(iv) a fourth element that is resistant to impacts and mechanical abrasions, said fourth element being made of a third vulcanized rubber obtained by vulcanization of a third unvulcanized rubber composition;
wherein said fourth element is bound to the first element to have the first element positioned between the second element and the fourth element; and
wherein the vulcanization of the third unvulcanized rubber composition is carried out simultaneously with the vulcanization of the first unvulcanized rubber composition and the second unvulcanized rubber composition. Preferably, wherein the simultaneous vulcanization of the first unvulcanized rubber composition, the second unvulcanized rubber composition and third unvulcanized rubber composition is carried out within a mold. More preferably, when the first hole of the first element is covered by the second element and the third element, a fourth hole is further provided across the fourth element, said fourth hole being coaxial with the first hole and having a cross-section at least equal to the one of the first hole.

According to another embodiment, the invention relates to the composite bumper defined hereinabove wherein the third vulcanized rubber further comprises reinforcing fibers, fabrics or felts. Preferably, the reinforcing fibers are Nylon fibers. More preferably, the third vulcanized rubber has hardness varying from 70 to 90 duro Shore A. Much more preferably, the first vulcanized rubber has a hardness of about 80 duro Shore A.

According to another embodiment, the invention relates to the composite bumper defined hereinabove, wherein the composite bumper is a vehicle composite bumper.

According to another embodiment, the invention relates to the composite bumper defined hereinabove, wherein the composite bumper is a loading dock bumper.

According to another embodiment, the invention relates to a first method for the manufacture of a composite bumper useful for the dampening of impact forces applied to a structure to be protected, the composite bumper comprising:
(i) a first element made of a rigid material, preferably at least one plate of a rigid material;
(ii) a second element that is resistant to impacts and mechanical abrasions, the second element being made of at least one of a first vulcanized rubber obtained by vulcanization of a first unvulcanized rubber composition, and/or being made of a rigid material; and (iii) a third element having the ability to undergo reversible elastic deformations, the third element being made of a second vulcanized rubber obtained by vulcanization of a second unvulcanized rubber composition,
the third element being at least in part positioned between the first element and the second element;
the third element being bound to the first element and the second element; and the first element being provided with at least one means adapted to cooperate with at least one fastening means for the fastening of the composite bumper to the structure to be protected; and said method comprising the steps of:
(a) providing the first element made of a rigid material and provided with at least one means adapted to cooperate with at least one fastening means for the fastening of the composite bumper to the structure to be protected;
(b) providing the first unvulcanized rubber composition and/or a rigid material defining the second element;
(c) providing the second unvulcanized rubber composition;
(d) positioning the second unvulcanized rubber composition to contact the first unvulcanized rubber composition and/or at least a portion of the rigid element of the second element, and at least a portion of the first element; and
(e) vulcanizing the second unvulcanized rubber composition while in contact with at least a portion of the first element and at least a portion of the rigid material of the second element, or
simultaneously vulcanizing the first unvulcanized rubber composition and the second unvulcanized rubber composition; while the second unvulcanized rubber composition contacts the first unvulcanized rubber composition and at least a portion of the first element, or
simultaneously vulcanizing the first unvulcanized rubber composition and the second unvulcanized rubber composition while the first unvulcanized composition contacts at least a portion of the rigid material of the second element, and while the second unvulcanized rubber composition contacts at least a portion the rigid material of the second element and contacts at least a portion of the first element.

According to another embodiment, the invention relates to the first method defined hereinabove, wherein step (e) is carried out within a mold.

According to another embodiment, the invention relates to the first method defined hereinabove, wherein the second element is made of the first vulcanized rubber obtained by vulcanization of the first unvulcanized rubber composition, and step (e) is simultaneously vulcanizing the first unvulcanized rubber composition and the second unvulcanized rubber composition; while the second unvulcanized rubber composition contacts the first unvulcanized rubber composition and at least a portion of the first element.

According to another embodiment, the invention relates to the first method defined hereinabove, wherein the second element is made of a plate of a rigid material, and step (e) is vulcanizing the second unvulcanized rubber composition while in contact with at least a portion of the first element and the rigid material of the second element.

Preferably, the rigid material of the second element is made of at least one plate made of a rigid polymeric material or of a at least one plate of a metallic material. More preferably, the at least one plate of a metallic material of the second element is selected from the group consisting of a steel plate, a stainless steel plate or an aluminum plate.

According to another embodiment, the invention relates to the first method defined hereinabove, wherein the second element made of the first vulcanized rubber obtained by vulcanization of the first unvulcanized rubber composition, and of at least one plate of a rigid element, and step (e) is simultaneously vulcanizing the first unvulcanized rubber composition and the second unvulcanized rubber composition while the first unvulcanized composition contacts at least a portion of the rigid material of the second element, and while the second unvulcanized rubber composition contacts at least a portion the rigid material of the second element and contacts at least a portion of the first element. Preferably, the rigid material of the second element is made of at least one plate made of a rigid polymeric material or of a at least one plate of a metallic material. More preferably, the at least one plate of a metallic material of the second element is selected from the group consisting of a steel plate, a stainless steel plate or an aluminum plate. Much more preferably, in the second element, the at least one plate of the rigid element is embedded within the first vulcanized rubber. Also, the first vulcanized rubber further preferably comprises reinforcing fibers, fabrics or felts. More preferably, the reinforcing fibers are Nylon fibers and/or the first vulcanized rubber has hardness varying from 70 to 90 duro Shore A. Much more preferably, the first vulcanized rubber has a hardness of about 80 duro Shore A.

According to another embodiment, the invention relates to the first method defined hereinabove, wherein the rigid material of the first element is made of at least one plate made of a rigid polymeric material and/or is made of a at least one plate made of a metallic material. Preferably, the at least one plate made of a metallic material of the first element is selected from the group consisting of a steel plate, a stainless steel plate or an aluminum plate.

According to another embodiment, the invention relates to the first method defined hereinabove, wherein each of the at least one means adapted to cooperate with at least one fastening means for the fastening of the composite bumper to the structure to be protected comprises a first hole provided in the first element. Preferably, each of the at least one means adapted to cooperate with at least one fastening means for the fastening of the composite bumper to the structure to be protected comprises a second hole across the second element and a third hole across the third element, said second hole and third hole:
being coaxial with the first hole, and
being of a larger cross-section than a cross-section of the first hole to allow
the housing of the head of the mechanical fastener, and
a contact of the head portion against the first element; and
wherein said second hole and third hole are provided during step (e) or in a subsequent step (f).

According to another embodiment, the invention relates to the method defined hereinabove, wherein step (d) further comprises positioning the first element within the second unvulcanized rubber composition; and wherein during step (e) the second unvulcanized rubber composition is vulcanized while in contact with the first element embedded therein.

According to another embodiment, the invention relates to the method defined hereinabove, wherein each of the means adapted to cooperate with at least one fastening means comprises a first hole provided in the first element; wherein each of the at least one fastening means is a nut-bolt assembly comprising a bolt having a head portion, a first shaft portion and a second shaft portion, and a nut adapted to engage the second shaft portion, wherein the head portion contacts the first element, the first shaft portion is at least in part positioned in the at least one first hole, wherein in step (d) the head portion and the first haft portion are positioned in the second unvulcanized rubber composition, and wherein during step (e) the second unvulcanized rubber composition is vulcanized while in contact with the head portion and the first haft portion embedded therein.

According to another embodiment, the invention relates to a second method for the manufacture of a composite bumper useful for the dampening of impact forces applied to a structure to be protected, the composite bumper comprising:
(i) a first element made of a rigid material, preferably at least one plate of a rigid material;
(ii) a second element that is resistant to impacts and mechanical abrasions, the second element being made of at least one of a first vulcanized rubber obtained by vulcanization of a first unvulcanized rubber composition, and of a rigid material; and
(iii) a third element having the ability to undergo reversible elastic deformations, the third element being made of a second vulcanized rubber obtained by vulcanization of a second unvulcanized rubber composition,
(iv) a fourth element that is resistant to impacts and mechanical abrasions, the fourth element being made of a third vulcanized rubber obtained by vulcanization of a third unvulcanized rubber composition;
the third element being at least in part positioned between the first element and the second element;
the third element being bound to the first element and the second element;
the fourth element being bound to the first element to have the first element positioned between the second element and the fourth element; and
the first element being provided with at least one means adapted to cooperate with at least one fastening means for the fastening of the composite bumper to the structure to be protected; and said method comprising the steps of:
  (A) providing the first element made of a rigid material and provided with at least one means adapted to cooperate with at least one fastening means for the fastening of the composite bumper to the structure to be protected;
  (B) providing the first unvulcanized rubber composition;
  (C) providing the second unvulcanized rubber composition and/or a plate of rigid material;
  (D) providing the third unvulcanized rubber composition;
  (E) positioning the second unvulcanized rubber composition to contact the first unvulcanized rubber composition and at least a first portion of the first element;
  (F) positioning the third unvulcanized rubber composition to contact at least a second portion of the at least one element, the first portion of the first element being opposite to the second portion of the at least one element; and
  (G) vulcanizing the second unvulcanized rubber composition while in contact with at least a portion of the first element and the plate of a rigid material of the second element,
    simultaneously vulcanizing the first unvulcanized rubber composition and the second unvulcanized rubber composition; while the second unvulcanized rubber composition contacts the first unvulcanized rubber composition and at least a portion of the first element,
    simultaneously vulcanizing the first unvulcanized rubber composition and the second unvulcanized rubber composition while the first unvulcanized composition contacts at least a portion of the plate of the rigid material of the second element, and while the second unvulcanized rubber composition contacts at least a portion the plate of the rigid material of the second element and contacts at least a portion of the first element, and
    simultaneously vulcanizing the third unvulcanized rubber composition; while the second unvulcanized rubber composition contacts at least the first portion of the first element, and while the third unvulcanized rubber composition contacts the at least a second portion of the at least one element.

According to another embodiment, the invention relates to the second method defined hereinabove, wherein step (G) is carried out within a mold.

According to another embodiment, the invention relates to the second method defined hereinabove, wherein the second element is made of the first vulcanized rubber obtained by vulcanization of the first unvulcanized rubber composition, and step (e) is simultaneously vulcanizing the first unvulcanized rubber composition, the second unvulcanized rubber composition and the third unvulcanized rubber composition; while the second unvulcanized rubber composition contacts the first unvulcanized rubber composition and at least a first portion of the first element, and the third unvulcanized rubber composition contacts a second portion of the first element.

According to another embodiment, the invention relates to the second method defined hereinabove, wherein the second element is made of a plate of a rigid material, and step (e) is vulcanizing the second unvulcanized rubber composition while in contact with at least a portion of the first element and the rigid material of the second element. Preferably, the rigid material of the second element is made of at least one plate made of a rigid polymeric material or of a at least one plate of a metallic material. More preferably, the at least one plate of a metallic material of the second element is selected from the group consisting of a steel plate, a stainless-steel plate or an aluminum plate.

According to another embodiment, the invention relates to the second method defined hereinabove, wherein the second element made of the first vulcanized rubber obtained by vulcanization of the first unvulcanized rubber composition, and of at least one plate of a rigid element, and step (e) is simultaneously vulcanizing the first unvulcanized rubber composition and the second unvulcanized rubber composition while the first unvulcanized composition contacts at least a portion of the rigid material of the second element, and while the second unvulcanized rubber composition contacts at least a portion the rigid material of the second element and contacts at least a portion of the first element. Preferably, the rigid material of the second element is made of at least one plate made of a rigid polymeric material or of a at least one plate of a metallic material. More preferably, the at least one plate of a metallic material of the second element is selected from the group consisting of a steel plate, a stainless-steel plate or an aluminum plate. Much more preferably, in the second element, the at least one plate of the rigid element is embedded within the first vulcanized rubber.

According to another embodiment, the invention relates to the second method defined hereinabove, wherein the first vulcanized rubber further comprises reinforcing fibers, fabrics or felts. Preferably, the reinforcing fibers are Nylon fibres, and/or the first vulcanized rubber has hardness varying from 70 to 90 duro Shore A. More preferably, the first vulcanized rubber has a hardness of about 80 duro Shore A.

According to another embodiment, the invention relates to the second method defined hereinabove, wherein the rigid material of the first element is made of at least one plate made of a rigid polymeric material or of a at least one plate made of a metallic material. Preferably, wherein the at least one plate made of a metallic material of the first element is selected from the group consisting of a steel plate, a stainless-steel plate or an aluminum plate.

According to another embodiment, the invention relates to the second method defined hereinabove, wherein each of the at least one means adapted to cooperate with at least one fastening means for the fastening of the composite bumper to the structure to be protected comprises a first hole provided in the first element; and wherein said first hole(s) is/are provided during step (G) or in a subsequent step.

According to another embodiment, the invention relates to the second method defined hereinabove, wherein each of the at least one means adapted to cooperate with at least one fastening means for the fastening of the composite bumper to the structure to be protected comprises a second hole across the second element and a third hole across the third element, said holes being coaxial with the first hole, and being of a larger cross-section than a cross-section of the first hole.

According to another embodiment, the invention relates to a use of the composite bumper as defined hereinabove, as a bumper for vehicle.

According to another embodiment, the invention relates to a use of the composite bumper as defined hereinabove, as a loading dock bumper.

According to another embodiment, the invention relates to a bumper for a vehicle, said bumper being as defined hereinabove.

According to another embodiment, the invention relates to a bumper for a loading dock, said bumper being as defined hereinabove.

BRIEF DESCRIPTION OF THE DRAWINGS

The present invention will be better understood with reference to preferred embodiments of the invention, referring to the following drawings.

DETAILED DESCRIPTION

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only.

In addition, although the optional configurations as illustrated in the accompanying drawings comprises various components and although the optional configurations of dock bumpers or vehicle bumpers as shown may consist of certain geometrical configurations as explained and illustrated herein, not all of these components and geometries are essential and thus should not be taken in their restrictive sense, i.e. should not be taken as to limit the scope of the present disclosure. It is to be understood that other suitable components and cooperations thereinbetween, as well as other suitable geometrical configurations may be used for the bumpers, and corresponding parts, as briefly explained and as can be easily inferred herefrom, without departing from the scope of the disclosure.

Figure 1:
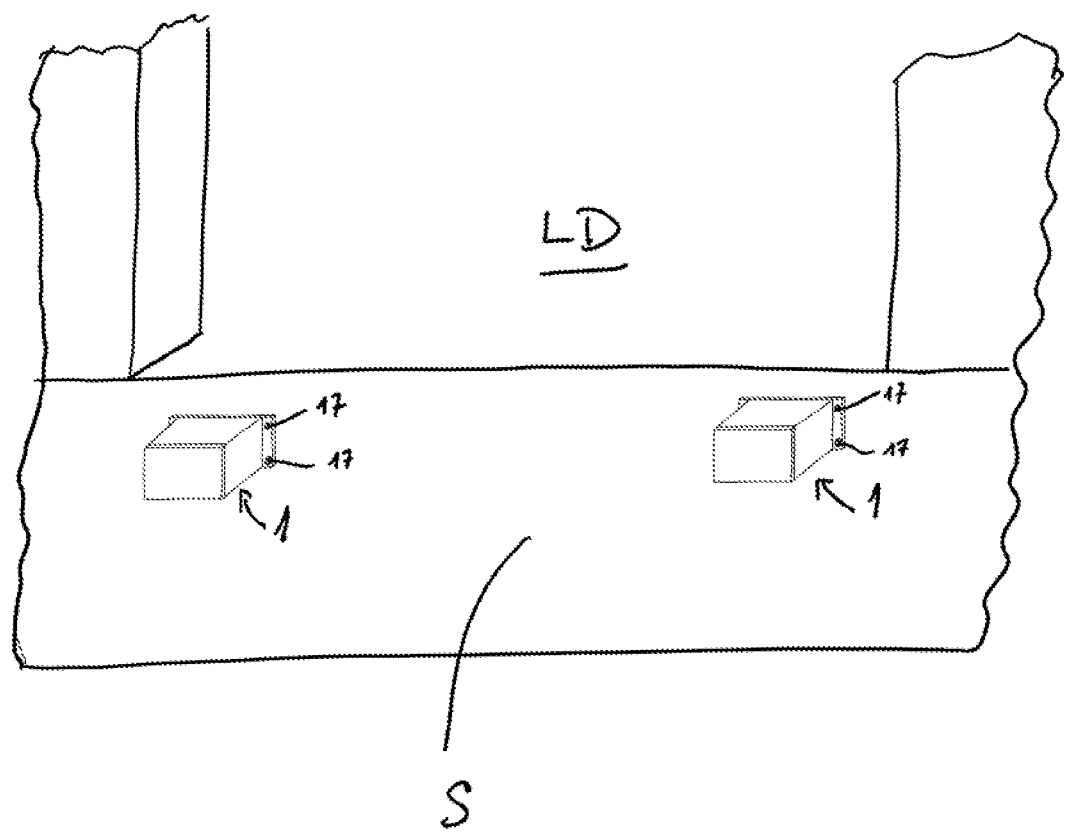
FIG. 1 is a side a perspective view of a loading dock provided with a first embodiment of a bumper according to the invention.

FIG. 1 represents a loading dock LD provided with a pair of composite bumpers 1 according to a first embodiment of the invention for the dampening of impact forces applied to a structure S to be protected.

Figure 2:
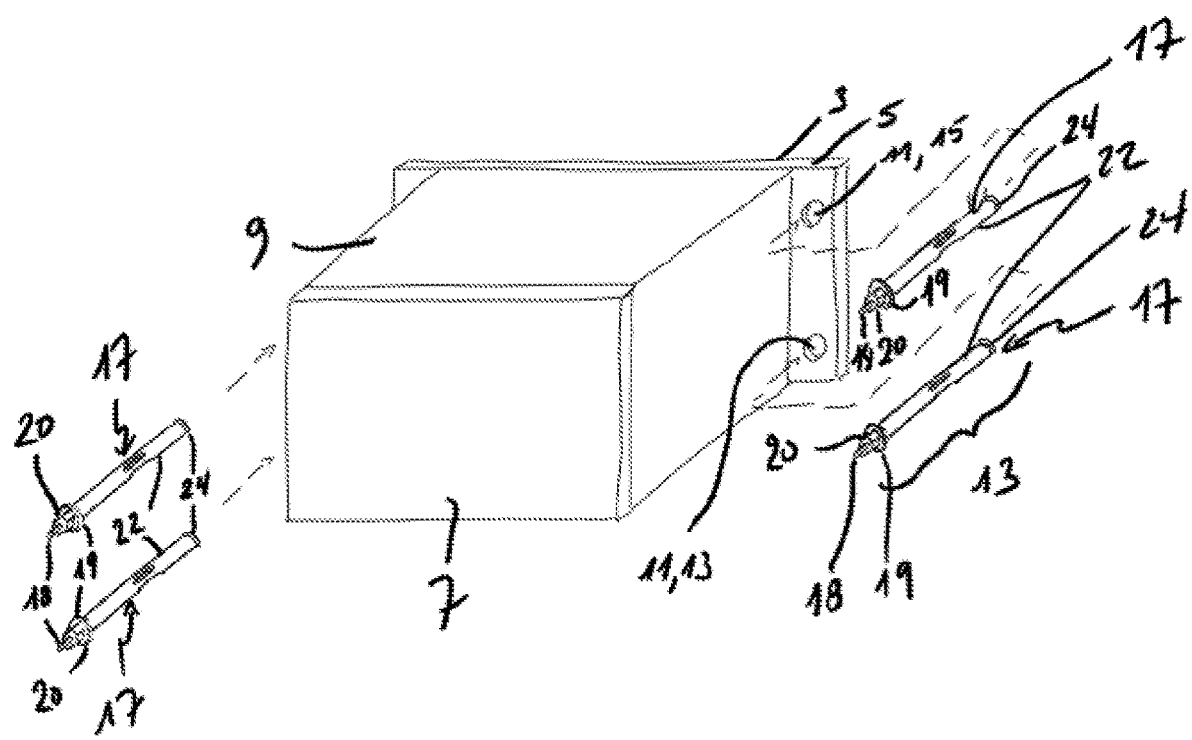
FIG. 2 is a perspective view of a bumper according to the first embodiment of the invention.

More particularly, as illustrated in FIG. 2, the composite bumper 1 according to the first embodiment of the invention comprises:
(i) a first element 3 made of a plate 5 of a rigid material;
(ii) a second element 7 that is resistant to impacts and mechanical abrasions, the second element being made of a first vulcanized rubber obtained by vulcanization of a first unvulcanized rubber composition, and
(iii) a third element 9 having the ability to undergo reversible elastic deformations, the third element 9 being made of a second vulcanized rubber obtained by vulcanization of a second unvulcanized rubber composition, wherein the third element 9 is at least in part positioned between the first element 3 and the second element 7;
wherein the third element 9 is bound to the first element 3 and the second element 7 because of the vulcanization of the second unvulcanized rubber composition while in contact with at least a portion of the first element 3 and the rigid material of the second element 7; and.
wherein the first element 3 is provided with at least one means 11 adapted to cooperate with at least one fastening means 13 for the fastening of the composite bumper 1 to the structure S to be protected.

The plate 5 may be made of any rigid polymer or metal. Preferably, the plate 5 is a steel plate, a stainless-steel plate or an aluminum plate, more preferably a stainless-steel plate.

The at least one means 11 may comprises holes, preferably as illustrated comprises four holes 15 (only two are illustrated, the two others being provided on the left side of the plate 15).

The at least one fastening means 13 may be of any type well known to a person skilled in the art. Preferably, for each hole 15, the fastening means may consist of a wedge anchor 17 provided with a threaded shaft 18, a washer 19, a nut 20, an expansion sleeve 22 and an expansion wedge 24. In use, the wedge anchor 17 is adapted to engaged the hole 15 and be housed within a hole 6 (e.g. a drilled hole) as shown in dotted lines in FIG. 3 and provided within the structure S to be protected (e.g. a concrete wall). The washer 19 is to be pressed by the nut 20 against the plate 5 while being screwed in the structure S to expand the expansion sleeve 22 within the hole 6. Of course, wedge anchors are well known to persons skilled in the art and do not need to be further explained.

According to a preferred aspect the composite bumper 1 of the first embodiment of the invention may be obtained by positioning within a mold, the plate 5 provided with holes 15a, the first unvulcanized rubber composition comprising reinforcing fibers, and the second unvulcanized rubber composition, and then performing the vulcanization according to techniques well known to those skilled in the art.

Figure 6:
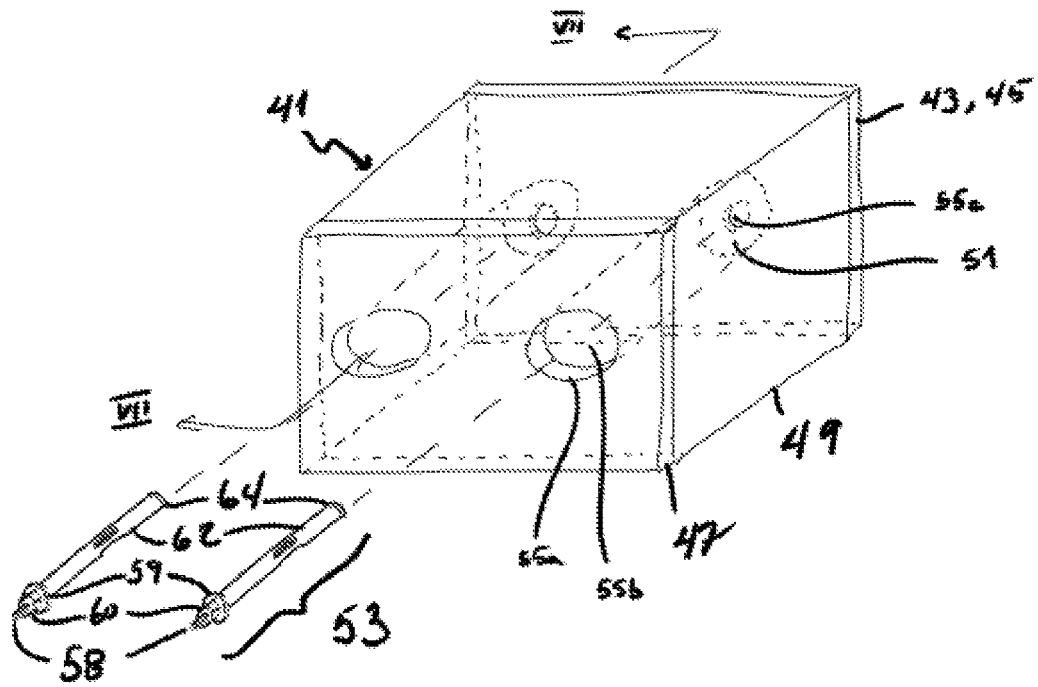
FIG. 6 is a perspective view of a bumper according to a second embodiment of the invention.
Figure 7:
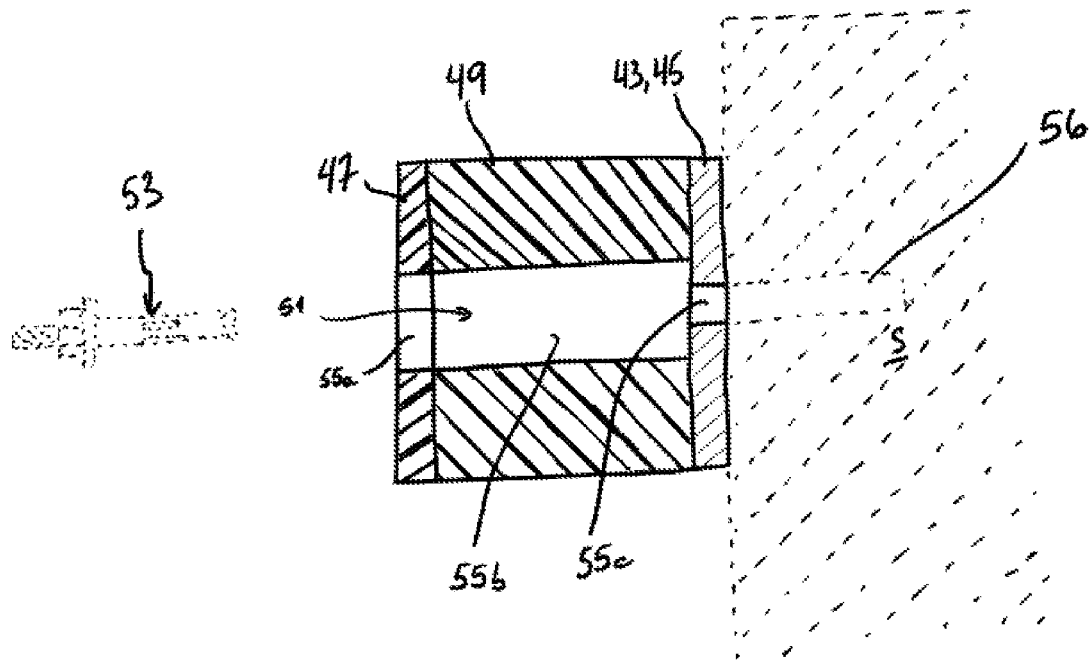
FIG. 7 is a cross-sectional view according to line VII-VII of FIG. 6.

More particularly, as illustrated in FIGS. 6 and 7, a second embodiment of the invention relates to a composite bumper 41 comprising:
  (i) a first element 43 made of a plate 45 of a rigid material;
  (ii) a second element 47 that is resistant to impacts and mechanical abrasions, the second element being made of a first vulcanized rubber obtained by vulcanization of a first unvulcanized rubber composition, and
  (iii) a third element 49 having the ability to undergo reversible elastic deformations, the third element 49 being made of a second vulcanized rubber obtained by vulcanization of a second unvulcanized rubber composition, wherein the third element 49 is at least in part positioned between the first element 43 and the second element 47;
wherein the third element 49 is bound to the first element 43 and the second element 47 because of the vulcanization of the second unvulcanized rubber composition while in contact with at least a portion of the first element 43 and the rigid material of the second element 47; and.
wherein the first element 43 is provided with two means 51 adapted to cooperate with at least one fastening means 53 for the fastening of the composite bumper 41 to the structure S to be protected.

Each of the means 51 comprises a first hole 55a, a second hole 55b and a third hole 55c respectively provided in the second element 47, the third element 49 and the plate 45 of the first element 43. The first hole 55a, the second hole 55b and the third hole 55c are coaxial, and the cross-section of the first hole 55a and the second hole 55b is greater that the cross-section of the third hole 55c.

The at least one fastening means 53 may be of any type well known to a person skilled in the art. Preferably, for each of the two means 51, the fastening means may consist of a wedge anchor 57 provided with a threaded shaft 58, a washer 59, a nut 60, an expansion sleeve 62 and an expansion wedge 64. In use, the wedge anchor 57 is to be engaged in first hole 55a, the second hole 55b and the third hole 55c, and housed within a hole 56 (e.g. a drilled hole) as shown in dotted lines in FIG. 7) and provided within the structure S to be protected (e.g. a concrete wall as shown in dotted lines in FIG. 7). The wedge anchor 59 is to be pressed by the nut 60 against the plate 45 while being screwed to expand the expansion sleeve 62 within the hole 56. Of course, wedge anchors are well known to persons skilled in the art and do not need to be further explained. Also, the first hole 55a and the second hole 55b define a housing for the nut 60, the washer 59 and a portion of the threaded shaft 58 opposite the expansion wedge 64.

According to anther preferred aspect the composite bumper 41 of the second embodiment of the invention may be obtained by positioning within a mold, the plate 45 provided with holes 45c, the first unvulcanized rubber composition comprising reinforcing fibers, and the second unvulcanized rubber composition, and then performing the vulcanization according to techniques well known to those skilled in the art. Preferably, the mold has such a design to create the holes 55a and 55b. Alternatively, the holes 55a and 55b may be created in a subsequent step with an appropriate tool (e.g. a drilling machine).

Figure 8:
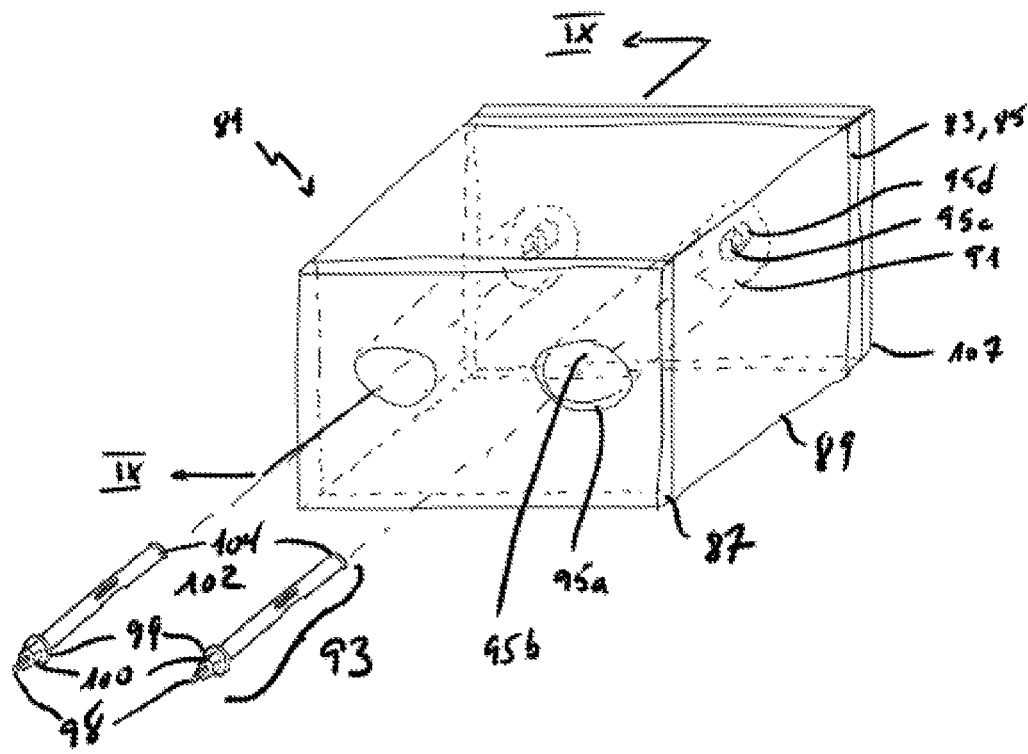
FIG. 8 is a perspective view of a bumper according to a second embodiment of the invention.
Figure 9:
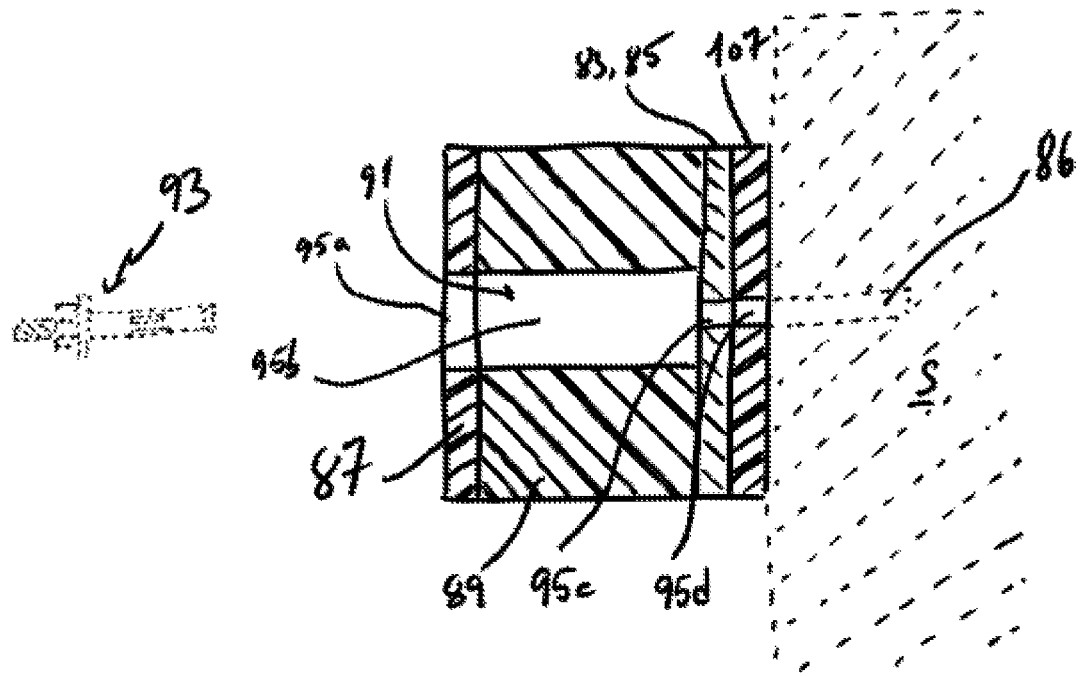
FIG. 9 is a cross-sectional view according to line IX-IX of FIG. 8.

More particularly, as illustrated in FIGS. 8 and 9, a third embodiment of the invention relates to a composite bumper 81 comprising:
  (i) a first element 83 made of a plate 85 of a rigid material;
  (ii) a second element 87 that is resistant to impacts and mechanical abrasions, the second element being made of a first vulcanized rubber obtained by vulcanization of a first unvulcanized rubber composition,
  (iii) a third element 89 having the ability to undergo reversible elastic deformations, the third element 89 being made of a second vulcanized rubber obtained by vulcanization of a second unvulcanized rubber composition, and
  (iv) a fourth element 107 that is resistant to impacts and mechanical abrasions, said fourth element being made of a third vulcanized rubber obtained by vulcanization of a third unvulcanized rubber composition;

wherein the third element 89 is at least in part positioned between the first element 83 and the second element 87;
wherein the third element 89 is bound to the first element 83 and the second element 87 because of the vulcanization of the second unvulcanized rubber composition while in contact with at least a portion of the first element 83 and the rigid material of the second element 87; and.
wherein the first element 83 is provided with two means 91 adapted to cooperate with at least one fastening means 93 for the fastening of the composite bumper 81 to the structure S to be protected.

Each of the means 91 comprises a first hole 95a, a second hole 95b, a third hole 95c and a fourth hole 95d, respectively provided in the second element 87, the third element 89, the plate 85 of the first element 83, and the fourth element 107. The first hole 95a, the second hole 95b, the third hole 95c and the fourth hole 95d are coaxial, and the cross-section of the first hole 95a and the second hole 95b is greater that the cross-section of the third hole 95c and the fourth hole 95d.

The at least one fastening means 93 may be of any type well known to a person skilled in the art. Preferably, for each of the two means 91, the fastening means 93 may consist of a wedge anchor 97 provided with a threaded shaft 98, a washer 99, a nut 100, an expansion sleeve 102 and an expansion wedge 104. In use, the wedge anchor 97 is to be engaged in the first hole 95a, the second hole 95b, the third hole 55c and the fourth hole 95d, and housed within a hole 86 (e.g. a drilled hole) as shown in dotted lines in FIG. 9) and provided within the structure S to be protected (e.g. a concrete wall as shown in dotted lines in FIG. 9). The wedge anchor 59 is to be pressed by the nut 100 against the plate 95 while being screwed in the structure S to expand the expansion sleeve 102 within the hole 86. Of course, wedge anchors are well known to persons skilled in the art and do not need to be further explained. Also, the first hole 95a and the second hole 95b define a housing for the nut 100, the washer 99 and a portion of the threaded shaft 98 opposite the expansion wedge 104.

According to anther preferred aspect the composite bumper 81 of the third embodiment of the invention may be obtained by positioning within a mold, the plate 85 provided with holes 85c, and the first unvulcanized rubber composition, the second unvulcanized rubber composition, and the third unvulcanized rubber composition, and then performing the vulcanization according to techniques well known to those skilled in the art. Preferably, the mold has such a design to create the holes 85a, 85b and 85d. Alternatively, the holes 85a, 85b and 85d may be created in a subsequent step with an appropriate tool (e.g. a drilling machine).

Figure 10:
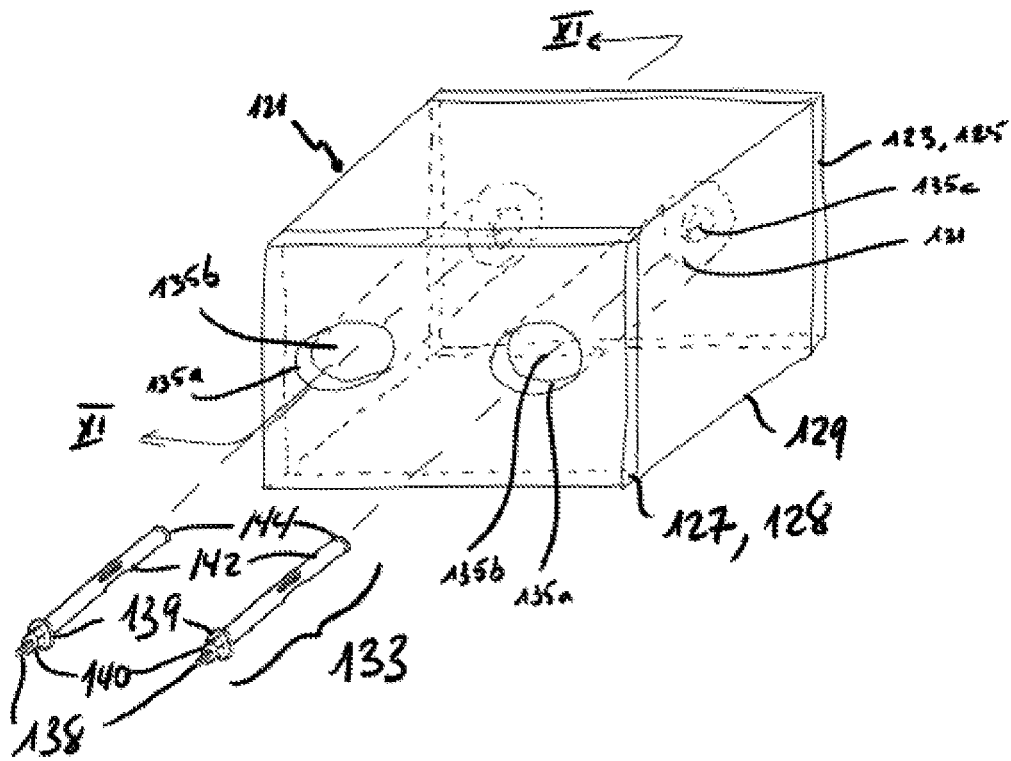
FIG. 10 is a perspective view of a bumper according to a third embodiment of the invention.
Figure 11:
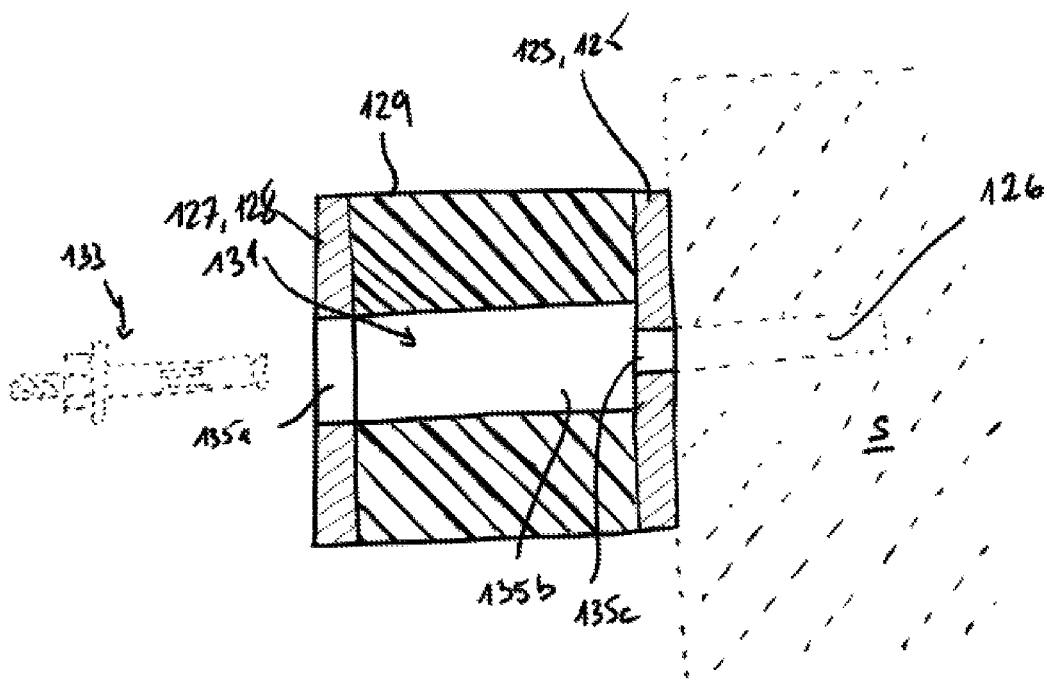
FIG. 11 is a cross-sectional view according to line XI-XI of FIG. 10.

More particularly, as illustrated in FIGS. 10 and 11, a fourth embodiment of the invention relates to a composite bumper 121 comprising:
 (i) a first element 123 made of a plate 125 of a rigid material;
 (ii) a second element 127 that is resistant to impacts and mechanical abrasions, the second element being made of a plate 128 of a rigid material, and
 (iii) a third element 129 having the ability to undergo reversible elastic deformations, the third element 129 being made of a second vulcanized rubber obtained by vulcanization of a second unvulcanized rubber composition, wherein the third element 129 is at least in part positioned between the first element 123 and the second element 127;
wherein the third element 129 is bound to the first element 123 and the second element 127 because of the vulcanization of the second unvulcanized rubber composition while in contact with at least a portion of the first element 123 and the rigid material of the second element 127; and.
wherein the first element 123 is provided with two means 131 adapted to cooperate with at least one fastening means 133 for the fastening of the composite bumper 121 to the structure S to be protected.

Each of the means 131 comprises a first hole 135a, a second hole 135b and a third hole 135c respectively provided in the second element 127, the third element 129 and the plate 125 of the first element 123. The first hole 135a, the second hole 135b and the third hole 135c are coaxial, and the cross-section of the first hole 135a and the second hole 135b is greater that the cross-section of the third hole 135c.

The at least one fastening means 133 may be of any type well known to a person skilled in the art. Preferably, for each of the two means 131, the fastening means 133 may consist of a wedge anchor 137 provided with a threaded shaft 138, a washer 139, a nut 140, an expansion sleeve 142 and an expansion wedge 144. In use, the wedge anchor 137 is to be engaged in the first hole 135a, the second hole 135b and the third hole 135c, and housed within a hole 126 (e.g. a drilled hole) as shown in FIG. 11 of the structure S to be protected (e.g. a concrete wall as shown in FIG. 11). The wedge anchor 139 is to be pressed by the nut 140 against the plate 125 while being screwed to expand the expansion sleeve 142 within the hole 126. Of course, wedge anchors are well known to persons skilled in the art and do not need to be further explained. Also, the first hole 135a and the second hole 135b define a housing for the nut 140, the washer 139 and a portion of the threaded shaft 138 opposite the expansion wedge 144.

According to another preferred aspect the composite bumper 121 of the fourth embodiment of the invention may be obtained by positioning within a mold, the plate 125 provided with holes 125c, the first unvulcanized rubber composition comprising reinforcing fibers, and the second unvulcanized rubber composition, and then performing the vulcanization according to techniques well known to those skilled in the art. Preferably, the mold has such a design to create the holes 125a and 125b. Alternatively, the holes 125a and 125b may be created in a subsequent step with an appropriate tool (e.g. a drilling machine).

Figure 12:
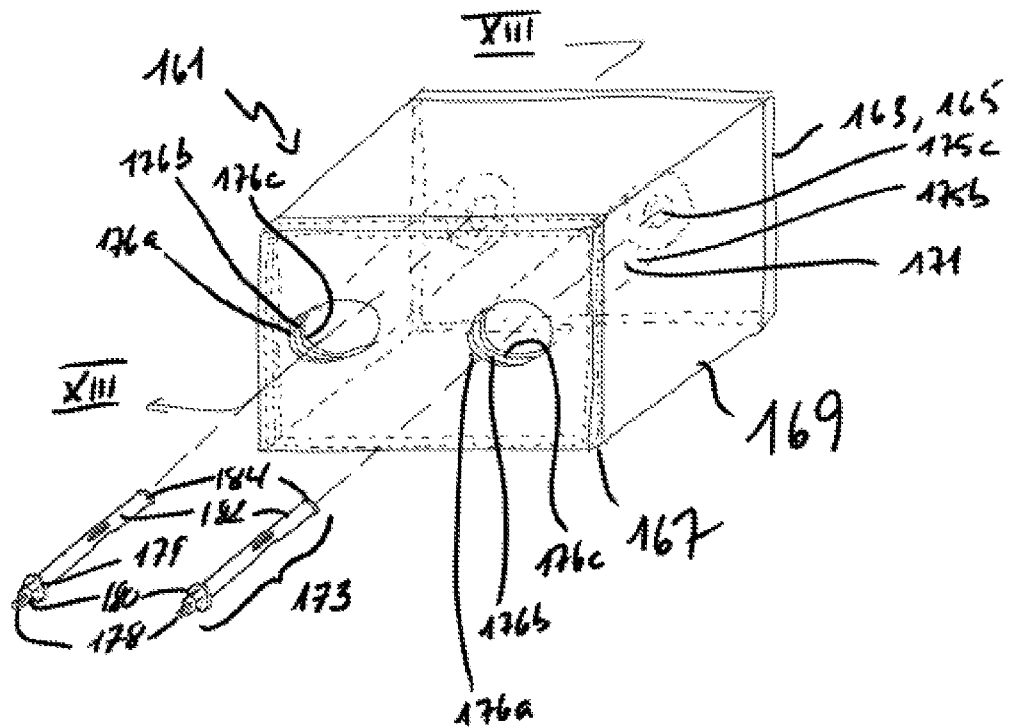
FIG. 12 is a perspective view of a bumper according to a fourth embodiment of the invention.
Figure 13:
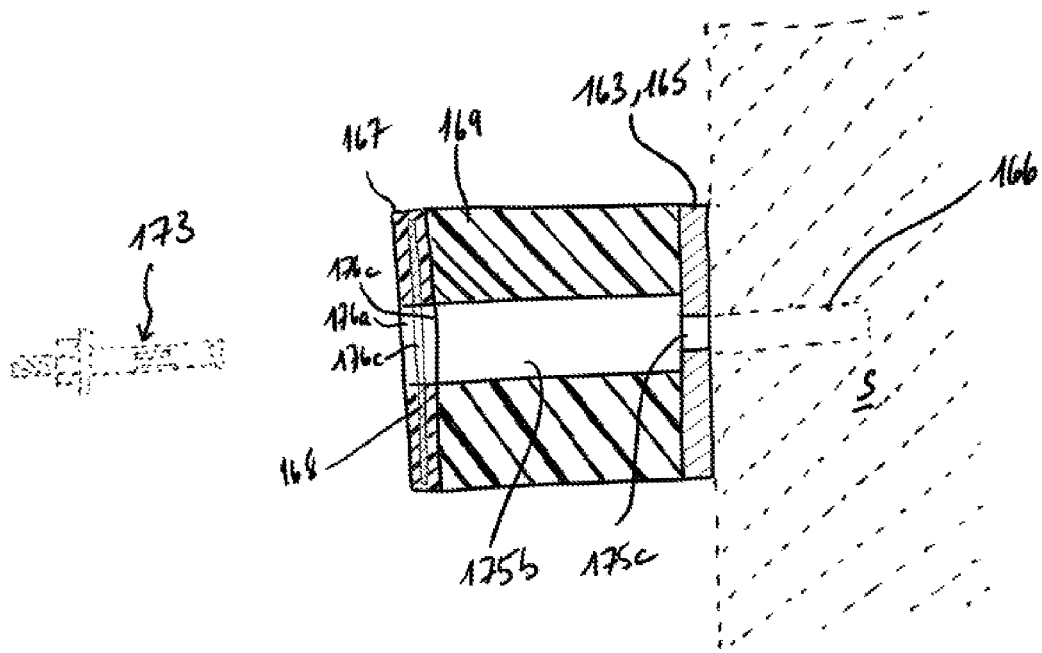
FIG. 13 is a cross-sectional view according to line XIII-XIII of FIG. 12.

More particularly, as illustrated in FIGS. 12 and 13, a fifth embodiment of the invention relates to a composite bumper 161 comprising:
 (i) a first element 163 made of a plate 165 of a rigid material;
 (ii) a second element 167 that is resistant to impacts and mechanical abrasions, the second element being made of a plate 168 of a rigid material embedded in a first vulcanized rubber obtained by vulcanization of a first unvulcanized rubber composition and of a rigid material, and
 (iii) a third element 169 having the ability to undergo reversible elastic deformations, the third element 169 being made of a second vulcanized rubber obtained by vulcanization of a second unvulcanized rubber composition, wherein the third element 169 is at least in part positioned between the first element 163 and the second element 167;
wherein the third element 169 is bound to the first element 163 and the second element 167 because of the vulcanization of the second unvulcanized rubber composition while in contact with at least a portion of the first element 163 and the rigid material of the second element 167; and.
wherein the first element 163 is provided with two means 171 adapted to cooperate with at least one fastening means 173 for the fastening of the composite bumper 161 to the structure S to be protected.

Each of the means 171 comprises first holes 176a, 176b and 176c, a second hole 175b and a third hole 175c respectively provided in the second element 177, the third element 169 and the plate 165 of the first element 163. The first holes 176a, 176b and 176c, the second hole 175b and the third hole 175c are coaxial, and the cross-section of the first holes 176a, 176b and 176c and the second hole 175b is greater that the cross-section of the third hole 175c.

The at least one fastening means 173 may be of any type well known to a person skilled in the art. Preferably, for each of the two means 171, the fastening means 173 may consist of a wedge anchor 177 provided with a threaded shaft 178, a washer 179, a nut 180, an expansion sleeve 182 and an expansion wedge 184. In use, the wedge anchor 177 is to be engaged in first holes 176a, 176b and 176c, the second hole 175b and the third hole 175c, and housed within a hole 166 (e.g. a drilled hole) as shown in FIG. 13 and provided within the structure S to be protected (e.g. a concrete wall as shown in FIG. 13). The wedge anchor 179 is to be pressed by the nut 180 against the plate 165 while being screwed in the structure S, to expand the expansion sleeve 182 within the hole 166. Of course, wedge anchors are well known to persons skilled in the art and do not need to be further explained. Also, the first holes 176a, 176b and 176c, and the second hole 175*b* define a housing for the nut 180, the washer 179 and a portion of the threaded shaft 178 opposite the expansion wedge 184.

According to another preferred aspect the composite bumper 161 of the fifth embodiment of the invention may be obtained by positioning within a mold, the plates 165 and 168, provided with holes 165*c* and 176*b*, the first unvulcanized rubber composition comprising reinforcing fibers, and the second unvulcanized rubber composition, and then performing the vulcanization according to techniques well known to those skilled in the art. Preferably, the mold has such a design to create the holes 176*a*, 176*c* and 165*b*. Alternatively, the holes 176*a*, 176*c* and 165*b* may be created in a subsequent step with an appropriate tool (e.g. a drilling machine).

Figure 14:
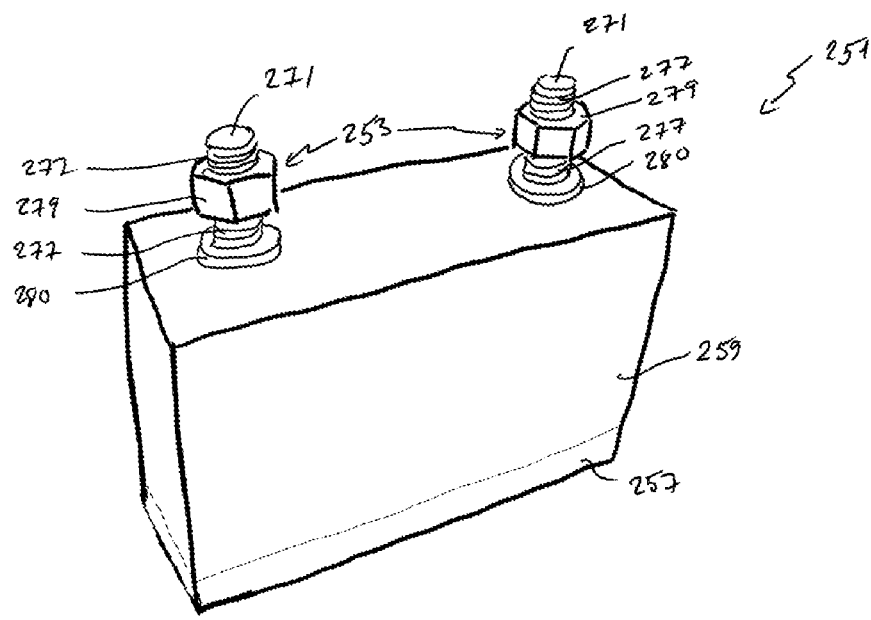
FIG. 14 is a perspective view of a bumper according to a fifth embodiment of the invention.
Figure 15:
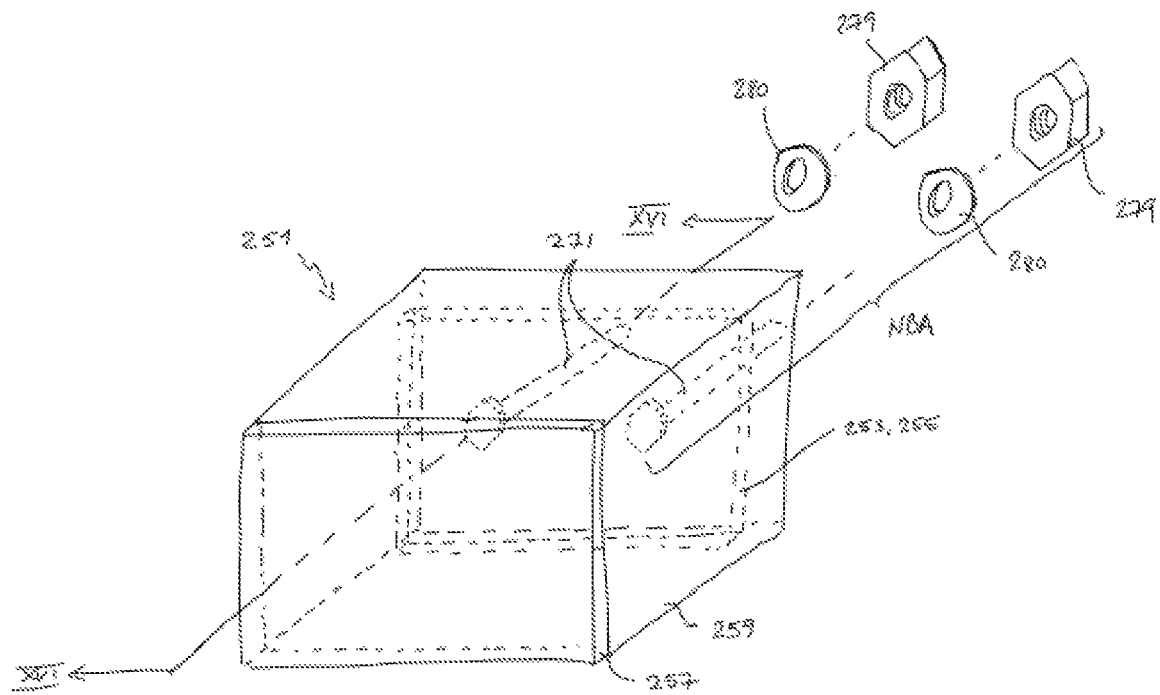
FIG. 15 is a perspective view of the bumper of FIG. 14 showing the positioning of the first element and bolts within the third element.
Figure 16:
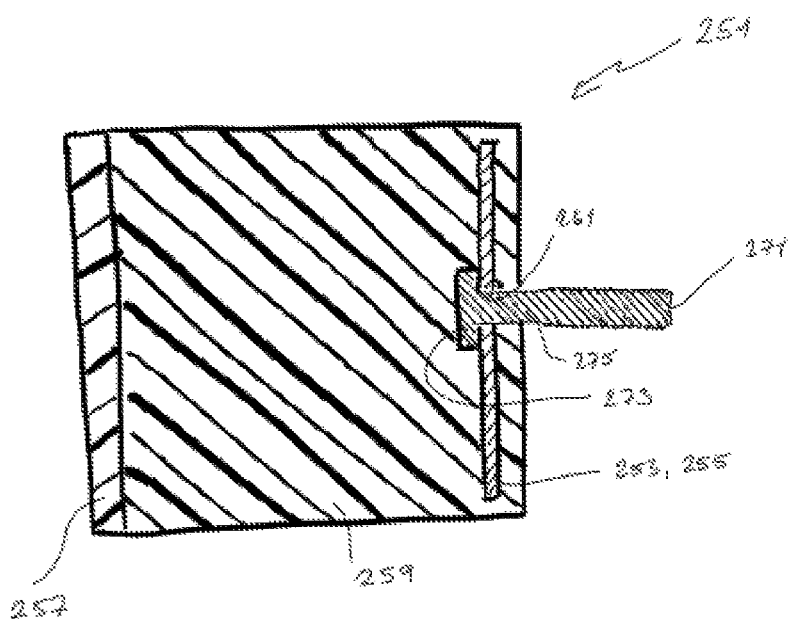
FIG. 16 is a cross-sectional view according to line XVI-XVI of FIG. 15.

FIGS. 14 to 16 represent a composite bumper 1 according to a fifth embodiment of the invention. The composite bumper 251 comprises:
(i) a first element 253 made of a plate 255 of a rigid material;
(ii) a second element 257 that is resistant to impacts and mechanical abrasions, the second element being made of a first vulcanized rubber obtained by vulcanization of a first unvulcanized rubber composition, and
(iii) a third element 259 having the ability to undergo reversible elastic deformations, the third element 259 being made of a second vulcanized rubber obtained by vulcanization of a second unvulcanized rubber composition, wherein the third element 259 is at least in part positioned between the first element 253 and the second element 257;
wherein the first element 253 is embedded within the third element 259;
wherein the third element 259 is bound to the first element 253 and the second element 257 because of the vulcanization of the second unvulcanized rubber composition while in contact with the first element 253 and the rigid material of the second element 257; and.
wherein the first element 253 is provided with at least one means 261 adapted to cooperate with at least one fastening means 263 for the fastening of the composite bumper 251 to a structure to be protected.

The plate 255 may be made of any rigid polymer or metal. Preferably, the plate 255 is a steel plate, a stainless-steel plate or an aluminum plate, more preferably a stainless-steel plate.

The at least one means 261 may comprises first holes, preferably as illustrated two first holes 265 each adapted to cooperate with a corresponding fastening means 263 which may be of any type well known to a person skilled in the art. Preferably, the fastening means 253 may consist of a two-part fastener, preferably a nut-bolt assembly NBA comprising
a bolt 271 having a head portion 273, a first shaft portion 275 and a second shaft portion 277, and a nut 279 adapted to engage the second shaft portion 277, wherein the head portion 271 contacts the first element 253, the first shaft portion 275 is at least in part positioned in corresponding first hole 265, and wherein the head portion 273 and the first haft portion 275 are embedded within the second vulcanized rubber of the third element 259.

In use, the second portion 277 is adapted to engage a corresponding hole provided in a structure to be protected and adapted to receive the composite bumper 251, and then the nut 279 is engaged (e.g. screwed) on a threaded surface of the second portion 277 for securing the composite bumper 251 to the structure. Optionally, a washer 280 may be present between the nut 279 and the structure.

According to a preferred aspect the composite bumper 251 of the fifth embodiment of the invention may be obtained by positioning within a mold, the plate 255 provided with holes 265 and the head portion 275 and first portion 277 of the shaft of each bolts 271, the first unvulcanized rubber composition comprising reinforcing fibers, and the second unvulcanized rubber composition, and then performing the vulcanization according to techniques well known to those skilled in the art.

The first vulcanized rubber of the second elements 7, 47, 87, 167 and 257 may be obtained by vulcanization of a second unvulcanized rubber composition in a mold, and/or the third vulcanized rubber of the fourth element 107 may be obtained by vulcanization of a third unvulcanized rubber composition in a mold. These first and second vulcanized rubber may be reinforced using fibers, fabrics, felts and/or any other known material used in reinforcing A vulcanized rubber, as apparent to a person skilled in the art. It should be understood that any material used to reinforce said rubber needs to be adapted to resist the temperatures associated with the vulcanization process.

Preferably, the reinforcing fibers are Nylon fibers. More preferably, the first vulcanized rubber has hardness varying from 70 to 90 duro Shore A. Much more preferably, the first vulcanized rubber has a hardness of about 80 duro Shore A. It should be readily understood by a person skilled in the art that the "durometer scale" references the standard for hardness measurement of rubber, plastic, and other non-metallic materials. Generally, most rubber material is categorized under the durometer scale of Shore A.

According to a preferred embodiment, the first and third vulcanized rubber may consist of those selected from the group consisting of natural rubber and synthetic rubbers.

The rigid material of the any one of the plates 5, 45, 85, 125, 128, 165, 168 and 255 of a rigid polymeric material or of a metallic material. More preferably, any one of plates 5, 45, 85, 125, 128, 165, 168 and 255 may be selected from the group consisting of a steel plate, a stainless-steel plate or an aluminum plate. Much more preferably, any one of plates 5, 45, 85, 125, 128, 165, 168 and 255 is a stainless-steel plate. The thickness of any of plates 5, 45, 85, 125, 128, 165, 168 and 255 may vary from few mils to 0.5 inch, preferably about 0.25 inch.

The second vulcanized rubber of the third elements 9, 49, 89, 129, 167 and 259 may be obtained by vulcanization of a third unvulcanized rubber composition in a mold.

More preferably, the third vulcanized rubber has hardness varying from 40 to 60 duro Shore A. Much more preferably, the first vulcanized rubber has a hardness of about 50 duro Shore A. Again, it should be readily understood by a person skilled in the art that the "durometer scale" references the standard for hardness measurement of rubber, plastic, and other non-metallic materials. Generally, most rubber material is categorized under the durometer scale of Shore A.

According to a preferred embodiment, the second vulcanized rubber may consist of those selected from the group consisting of natural rubber and synthetic rubbers.

Figure 3:
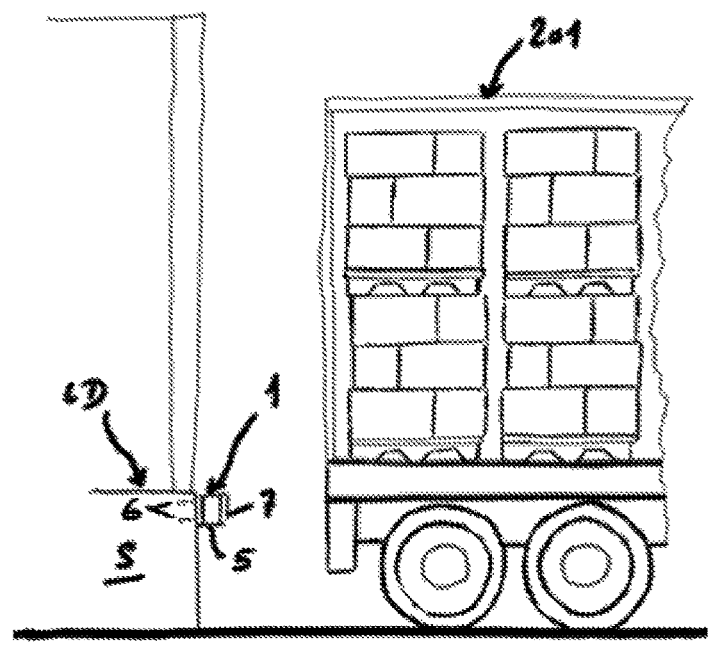
FIG. 3 is a side elevational view of the bumper according to the first embodiment of the invention installed for dampening an impact force applied thereto.

As illustrated in FIG. 3, the composite bumper 1 is installed on the structure S of the loading dock LD at a position where the rear of a vehicle 201 will impact the structure S. This composite bumper 1 is preferably installed with anchor screws 17 defined above housed within a hole provided in the structure S. More particularly, each anchor screw 17 is housed in a hole of the structure S until the nut 20 presses the washer 19 against the plate 5 (and of course position and presses the plate 5 against the structure S while expanding the expansion sleeve 22 within the hole (e.g. a drilled hole) provided within the structure S to be protected (e.g. a concrete wall)).

Figure 4:
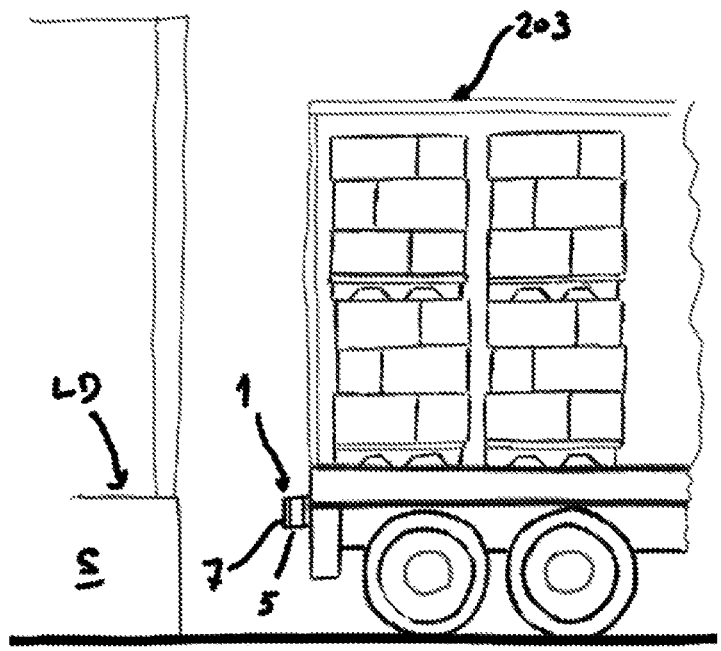
FIG. 4 is a side elevational view of the bumper according to the first embodiment of the invention installed at the rear of a vehicle, for dampening an impact force applied thereto.

Alternatively, as illustrated in FIG. 4, the composite bumper 1 or 251 may be installed on the rear structure RS of a vehicle 203. In such case, wedge anchor are preferably replaced by a nut-bolt assembly NBA or a screw. Of course, a nut-bolt assembly engages a hole provided in the structure to be protected, and a screw may be screwed directly in the structure to be protected. Nut-bolt assemblies and screws, especially metal screws, are well known to persons skilled in the art and do not need to be described in details. A washer may be optionally provided to cooperate with head of the bolt, the nut or the screw.

Alternatively, it is possible to have one or several composite bumpers 1, preferably two, installed on the structure S and/or the rear structure RS of the vehicle 203.

Figure 5:
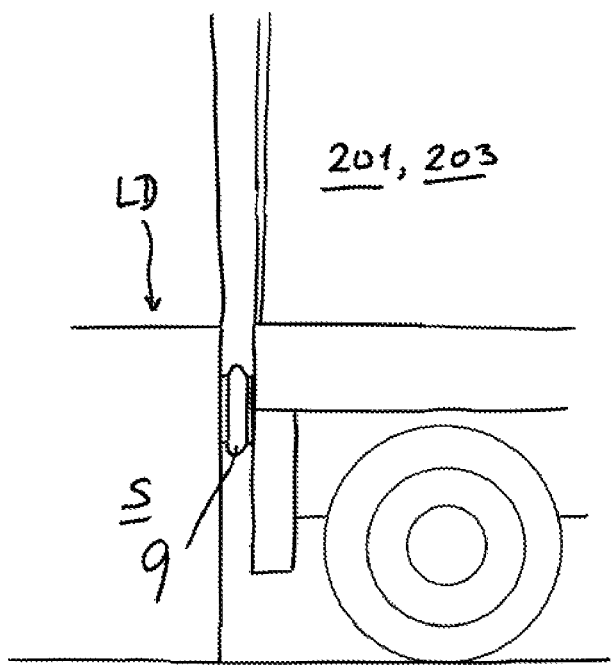
FIG. 5 is a side elevational view of the bumper of FIG. 3 or 4, dispersing the energy of an impact.

As illustrated in FIG. 5, when there is an impact between, the vehicle 201 or 203 and the structure S, the second vulcanized rubber of the third element 9 undergoes a reversible elastic deformation to dissipate impact energies and thereby protect the structure S of the loading dock LD and the rear structure RS of the truck 201 or 203.

Also, because the first element 3 is resistant to impacts and mechanical abrasions, when the structure of the vehicle 201 or 203 and the structure S remain in contact, damage to this first element 3 and/or the structure S is significantly reduced or avoided when the vehicle 201 or 203 is subjected to vertical movements (due to variations in the weight of the load).

Of course, the composite bumper 1 may be replaced by any one of the composite bumpers 41, 81, 121, 161 or 251.

It will be appreciated from the foregoing disclosure that there is provided a composite bumper which can offer substantial improvements over the known prior art in that, in virtue of its design and components, as explained herein, it advantageously enables to a) absorb/mitigate impacts, shocks, vibrations and/or noises; b) increase lifetime expectancy of the various components, and many more. However, the scope of the claims should not be limited by the preferred embodiments set forth in the examples, but should be given the broadest interpretation consistent with the description as a whole.

The invention claimed is:

1. A composite bumper for the dampening of impact forces applied to a structure to be protected the composite bumper being a dock bumper or a vehicle bumper, the composite bumper comprising:
   (i) a first element made of a metallic rigid material;
   (ii) a second element that is resistant to impacts and mechanical abrasions, the second element being made of at least one of a first vulcanized rubber obtained by vulcanization of a first unvulcanized rubber composition and/or made of a metallic rigid material; and
   (iii) a third element having the ability to undergo reversible elastic deformations, the third element being made of a second vulcanized rubber obtained by vulcanization of a second unvulcanized rubber composition;
   wherein the third element is at least in part positioned between the first element and the second element;
   wherein the third element is bound to the first element and the second element;
   wherein:
      the second unvulcanized rubber composition is vulcanized while in contact to at least a portion of the first element and at least a portion of the rigid material of the second element,
      the first unvulcanized rubber composition and the second unvulcanized rubber composition are simultaneously vulcanized while the second unvulcanized rubber composition contacts the first unvulcanized rubber composition and at least a portion of the first element, or
      the first unvulcanized rubber composition and the second unvulcanized rubber composition are simultaneously vulcanized while the first unvulcanized rubber composition contacts at least a portion of the rigid material of the second element, and while the second unvulcanized rubber composition contacts at least a portion the rigid material of the second element and contacts at least a portion of the first element; and
   wherein the first element is provided with at least one means adapted to cooperate with at least one fastening means for the fastening of the composite bumper to the structure to be protected.

2. The composite bumper according to claim 1, wherein the vulcanization or the simultaneous vulcanization is carried within a mold.

3. The composite bumper according to claim 2, wherein the second element is made of the first vulcanized rubber obtained by vulcanization of the first unvulcanized rubber composition.

4. The composite bumper according to claim 2, wherein the second element is made of the first vulcanized rubber obtained by vulcanization of the first unvulcanized rubber composition, and is made of at least one plate of a rigid element.

5. The composite bumper according to claim 4, wherein in the second element, the at least one plate of the rigid element is embedded within the first vulcanized rubber.

6. The composite bumper according to claim 1, wherein the first vulcanized rubber further comprises reinforcing fibers, fabrics or felts.

7. The composite bumper according to claim 1, wherein each of the means adapted to cooperate with at least one fastening means comprises
   a first hole provided in the first element; and
   wherein each of the at least one of the fastening means is a mechanical fastener having a head portion and a threaded portion, and being positioned across the first hole of the first element, the head portion of the mechanical fastener being adapted to contact the first element, and the threaded portion of the mechanical fastener being adapted to be screwed in the structure to be protected.

8. The composite bumper according to claim 7, wherein when the first hole of the first element is covered by the second element and the third element, then a second hole is provided across the second element and a third hole is provided across the third element, said second hole and third hole
   being coaxial with the first hole of in the first element, and
   being of a larger cross-section than a cross-section of the first hole to allow
      a housing of the head portion, and
      a contact of the head portion against the first element.

9. The composite bumper according to claim 1, wherein the first element is embedded within the second vulcanized rubber of the third element, wherein each of the means adapted to cooperate with at least one fastening means comprises a first hole provided in the first element; wherein each of the at least one fastening means is a nut-bolt assembly comprising a bolt having a head portion, a first shaft portion and a second shaft portion, and a nut adapted to engage the second shaft portion, wherein the head portion contacts the first element, the first shaft portion is at least in part positioned in the at least one first hole, and wherein the head portion and the first haft portion are embedded within the second vulcanized rubber.

10. The composite bumper according to claim 1, further comprising:
   (iv) a fourth element that is resistant to impacts and mechanical abrasions, said fourth element being made of a third vulcanized rubber obtained by vulcanization of a third unvulcanized rubber composition;
   wherein said fourth element is bound to the first element to have the first element positioned between the second element and the fourth element; and
   wherein the vulcanization of the third unvulcanized rubber composition is carried out simultaneously with the vulcanization of the first unvulcanized rubber composition and the second unvulcanized rubber composition.

11. The composite bumper according to claim 10, wherein when the first hole of the first element is covered by the second element and the third element, a fourth hole is further provided across the fourth element, said fourth hole being coaxial with the first hole and having a cross-section at least equal to the one of the first hole.

12. The composite bumper according to claim 10, wherein the third vulcanized rubber further comprises reinforcing fibers, fabrics or felts.

13. A method for the manufacture of a composite bumper useful for the dampening of impact forces applied to a structure to be protected, the composite bumper being a dock bumper or a vehicle bumper, the composite bumper comprising:
   (i) a first element made of a metallic rigid material;
   (ii) a second element that is resistant to impacts and mechanical abrasions, the second element being made of at least one of a first vulcanized rubber obtained by vulcanization of a first unvulcanized rubber composition, and/or being made of a metallic rigid material; and
   (iii) a third element having the ability to undergo reversible elastic deformations, the third element being made of a second vulcanized rubber obtained by vulcanization of a second unvulcanized rubber composition,
   the third element being at least in part positioned between the first element and the second element;
   the third element being bound to the first element and the second element; and
   the first element being provided with at least one means adapted to cooperate with at least one fastening means for the fastening of the composite bumper to the structure to be protected; and
   said method comprising the steps of:
   (a) providing the first element, said first element being further provided with at least one means adapted to cooperate with at least one fastening means for the fastening of the composite bumper to the structure to be protected;
   (b) providing the first unvulcanized rubber composition and/or a metallic rigid material defining the second element;
   (c) providing the second unvulcanized rubber composition;
   (d) positioning the second unvulcanized rubber composition to contact the first unvulcanized rubber composition and/or at least a portion of the metallic rigid material of the second element, and at least a portion of the first element; and
   (e) vulcanizing the second unvulcanized rubber composition while in contact with at least a portion of the first element and/or at least a portion of the metallic rigid material of the second element, or
   simultaneously vulcanizing the first unvulcanized rubber composition and the second unvulcanized rubber composition, while the second unvulcanized rubber composition contacts the first unvulcanized rubber composition and at least a portion of the first element, or
   simultaneously vulcanizing the first unvulcanized rubber composition and the second unvulcanized rubber composition while the first unvulcanized composition contacts at least a portion of the metallic rigid material of the second element, and while the second unvulcanized rubber composition contacts at least a portion the rigid material of the second element and contacts at least a portion of the first element.

14. The method according to claim 13, wherein step (e) is carried out within a mold.

15. The method according to claim 14, wherein each of the at least one means adapted to cooperate with at least one fastening means for the fastening of the composite bumper to the structure to be protected comprises
   a first hole provided in the first element.

16. The method according to claim 15, wherein each of the at least one means adapted to cooperate with at least one fastening means for the fastening of the composite bumper to the structure to be protected comprises a second hole across the second element and a third hole across the third element, said second hole and third hole:
   being coaxial with the first hole, and
   being of a larger cross-section than a cross-section of the first hole to allow
      the housing of the head of the mechanical fastener, and
      a contact of the head portion against the first element; and
   wherein said second hole and third hole are provided during step (e) or in a subsequent step (f).

17. The method according to claim 13, wherein step (d) further comprises positioning the first element within the second unvulcanized rubber composition; and
   wherein during step (e) the second unvulcanized rubber composition is vulcanized while in contact with the first element embedded therein.

18. The method according to claim 17, wherein each of the means adapted to cooperate with at least one fastening means comprises a first hole provided in the first element; wherein each of the at least one fastening means is a nut-bolt assembly comprising a bolt having a head portion, a first shaft portion and a second shaft portion, and a nut adapted to engage the second shaft portion, wherein the head portion contacts the first element, the first shaft portion is at least in part positioned in the at least one first hole, wherein in step (d) the head portion and the first haft portion are positioned in the second unvulcanized rubber composition, and wherein during step (e) the second unvulcanized rubber composition is vulcanized while in contact with the head portion and the first haft portion embedded therein.

19. A method for the manufacture of a composite bumper useful for the dampening of impact forces applied to a structure to be protected, the composite bumper being a dock bumper or a vehicle bumper, the composite bumper comprising:

a first element made of a metallic rigid material;
(ii) a second element that is resistant to impacts and mechanical abrasions, the second element being made of at least one of a first vulcanized rubber obtained by vulcanization of a first unvulcanized rubber composition, and of a metallic rigid material; and
(iii) a third element having the ability to undergo reversible elastic deformations, the third element being made of a second vulcanized rubber obtained by vulcanization of a second unvulcanized rubber composition,
(iv) a fourth element that is resistant to impacts and mechanical abrasions, the fourth element being made of a third vulcanized rubber obtained by vulcanization of a third unvulcanized rubber composition;
the third element being at least in part positioned between the first element and the second element;
the third element being bound to the first element and the second element;
the fourth element being bound to the first element to have the first element positioned between the second element and the fourth element; and
the first element being further provided with at least one means adapted to cooperate with at least one fastening means for the fastening of the composite bumper to the structure to be protected; and
said method comprising the steps of:
(A) providing the first element made of a rigid material and provided with at least one means adapted to cooperate with at least one fastening means for the fastening of the composite bumper to the structure to be protected;
(B) providing the first unvulcanized rubber composition;
(C) providing the second unvulcanized rubber composition and/or a plate of rigid material;
(D) providing the third unvulcanized rubber composition;
(E) positioning the second unvulcanized rubber composition to contact the first unvulcanized rubber composition and at least a first portion of the first element;
(F) positioning the third unvulcanized rubber composition to contact at least a second portion of the at least one element, the first portion of the first element being opposite to the second portion of the at least one element; and
(G) vulcanizing the second unvulcanized rubber composition while in contact with at least a portion of the first element and the plate of a metallic rigid material of the second element,
simultaneously vulcanizing the first unvulcanized rubber composition and the second unvulcanized rubber composition; while the second unvulcanized rubber composition contacts the first unvulcanized rubber composition and at least a portion of the first element,
simultaneously vulcanizing the first unvulcanized rubber composition and the second unvulcanized rubber composition while the first unvulcanized composition contacts at least a portion of the plate of the rigid material of the second element, and while the second unvulcanized rubber composition contacts at least a portion the plate of the metallic rigid material of the second element and contacts at least a portion of the first element, and
simultaneously vulcanizing the third unvulcanized rubber composition;
while the second unvulcanized rubber composition contacts at least the first portion of the first element, and while the third unvulcanized rubber composition contacts the at least a second portion of the at least one element.

20. The method according to claim 19, wherein step (G) is carried out within a mold.

* * * * *